Oct. 28, 1941.     B. PRATT     2,260,692
THERMOSTATIC VALVE
Filed Sept. 24, 1937
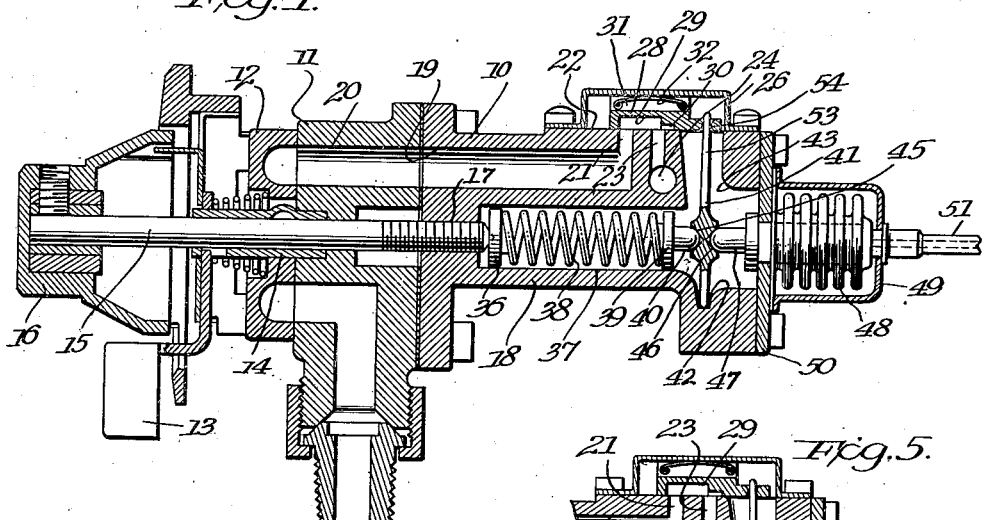
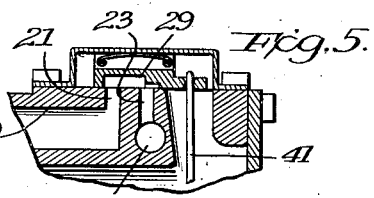
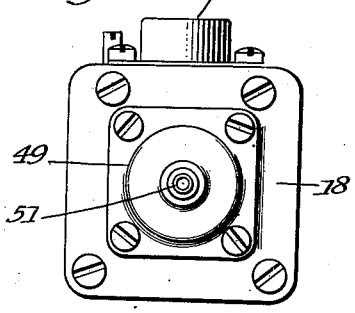
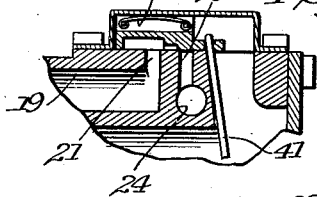
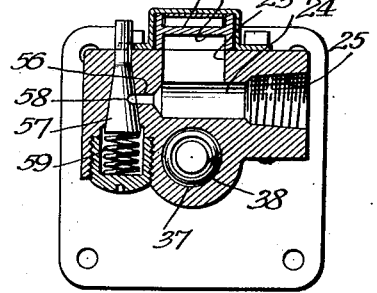
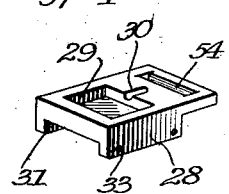
Inventor
Best Pratt Patented Oct. 28, 1941

2,260,692

UNITED STATES PATENT OFFICE 2,260,692

THERMOSTATIC VALVE

Best Pratt, Chicago, Ill., assignor to Brake Equipment & Supply Co., Chicago, Ill., a corporation of Illinois Application September 24, 1937, Serial No. 165,583

1 Claim. (Cl. 236—99)

The present invention relates to a thermostatic valve.

The principal object of the invention is to provide a thermostatic valve primarily intended for use to control the flow of gas to the oven burner of a gas range.

Further objects of the invention are to provide a thermostatic valve which is simple in construction and of maximum efficiency in the operation.

Other objects and advantages of the invention will be apparent from the following specification and drawing, wherein:

Figure 1 is a longitudinal central sectional view showing the valve of the present invention secured to a manual stop valve which may be used to control the flow of gas thereto.

Figure 2 is an end view of the right hand end of the valve shown in Figure 1.

Figure 3 is a top plan view of the valve of the invention with the valve element thereof removed, a portion of the view being in horizontal section.

Figure 4 is a transverse sectional view on the line 4—4 of Figure 3.

Figures 5 and 6 are fragmentary views showing the valve element of the invention in different positions and, Figure 7 is a detail view showing in perspective the valve element included in the invention.

The numeral 10 generally designates the thermostatic valve of the present invention which, in Figure 1, is shown secured to the body element of a manual stop valve 11 of the type disclosed in the patent of Best Pratt and George F. Weinriech issued June 8, 1937, No. 2,083,087. The manual valve 11 includes a rotary disc valve 12 operated by a handle 13 connected to a hollow shaft 14 keyed to the valve disc 12. A thermostatic valve operating shart 15 provided with a dial 16 is mounted concentrically within the hollow shaft 14 and extends through the body element of the manual valve 11 and into threaded engagement with a bore 17 in the body 18 of the thermostatic valve 10.

The thermostatic valve 10 is adapted to receive gas from the manual valve 11 through a passage 19 aligned with the outlet passage 20 of the stop valve. The passage 19, at its inner end, opens through a port 21 to a seat surface 22 on one side of the body 18. A second port 23 is slightly spaced from the port 21, port 23 opening preferably to a transverse passage 24 in the body 18. The outer end of passage 24 is threaded as indicated at 25 in Figure 4 so that a pipe or tube may be connected thereto for flow of gas from the thermostatic valve to the oven burner. A casing or cover 26 is secured to the seat surface 22 by suitable machine screws, and this casing encloses a slide valve member 28 having a passage or cavity 29 formed therein adapted to bridge the two ports 21 and 23 to permit flow of gas through the valve. As is best shown in Figure 3, the ports 21 and 23 are preferably rectangular in outline and, as illustrated in Figure 7, the passage 29 is preferably also rectangular and of sufficient size to completely bridge the two ports. The cavity or passage 29 has a tail port 30 extending from its rear surface, which port is of less depth than the passage 29 and of substantially smaller width. The slide valve 28 has spaced abutments 31 extending from its upper surface and a bowed spring 32 is positioned between these abutments to bear upon the under side of the housing 26, the ends of the spring being fitted about pins extending through small apertures 33 in the abutments. By the provision of the spring 32, the slide valve 28 will be held pressed against the seat surface 22 of the body element 18, and as shown in Figure 4, the casing 26 fits closely about the side walls of the slide valve 28 to guide the movement of the latter.

As best shown in Figure 1, the inner end of the thermostatic valve operating shaft 15 bears against a disc 36 slidable in a bore 37 in the body member 18, the disc being seated in the adjacent end of a resilient element such as a coil spring 38, and the other end of the coil spring having a plunger element 39 fitted therein. The plunger element 39 includes a rounded head such as 40 which bears upon a lever 41 mounted for swinging movement in a socket 42 in the central chamber or cavity 43 of the body element 18. The lever 41 has a socket 45 formed on its side adjacent the plunger 40 to receive the head of the latter. On the opposite side of the lever 41 there is formed a second socket 46, which socket receives a plunger 47 operated by a bellows thermostat 48 mounted in a casing 49 secured to the end plate 50 which closes the open end of the cavity 43. The bellows 48 is operated from a bulb element, not shown, in the oven of the range through a fluid line 51 in the usual manner.

The free end 53 of lever 41 engages an aperture 54 in the slide valve 28 so that the slide valve will be moved in accordance with the movements of the lever 41 to control the flow of gas through the thermostatic valve.

For the purpose of always maintaining at least a low flow of gas to the oven burner so long as the manual valve 12 is open, and even though the slide valve 28 of the thermostatic valve is in closed position, a by-pass passage 56 (Figures 3 and 4) is provided in the thermostatic valve. This passage comprises two ports respectively extending from the passages 19 and 24 and opening to a tapered plug valve 57 having a passage 58 therein through which the by-pass will be kept open. The plug valve 57 is maintained seated by a coil spring 59 and its position may be adjusted, as by engagement of a screw driver in a kerf in its end which projects from the body 18 of the valve.

As indicated in Figure 3, a passage 19a opens from the supply passage 19 of the valve. Passage 19a is adapted to be connected to the pilot burner of an oven, so that there will be a pilot flame so long as there is gas flow past the manual valve.

The operation of my thermostatic valve is as follows:

When the manual valve disc 12 is in closed position so that no gas will flow into the passages 19 and 20, there will of course be no gas supplied to the oven burner, even though the slide valve 28 of the thermostat valve may be in open position due to the position of the thermostatic control dial 16. When it is desired to have a flame at the burner in the oven, the thermostatic dial 16 will be rotated to the desired seating and, due to the threaded engagement of the shaft 15 and the bore 17 of the thermostatic valve, the shaft 15 will move inwardly, exerting pressure upon the spring 38 so that the lever 41 will be swung to the right (in Figure 1), thereby also moving the slide valve 28 to the right so that the cavity 28 will bridge the supply port 21 and delivery port 23 to the extent for which shaft 15 is operated. The right hand swinging movement of the lever 41 will be permitted by the plunger 47 on the right hand side of the lever because of the fact that the thermostatic bulb 48 will then be in a contracted condition. If the manual valve disc 12 is then opened, gas will flow through the oven burner and the latter and also the oven pilot burner receiving gas from port 19a may be ignited.

As the oven becomes heated, the bellows 48 will gradually expand, eventually moving the lever 41 to the left to tend to close off the delivery port 23 and the flow of gas to the burner. This movement of the lever 41 to the left will be possible because of the positioning of the spring 38 between the left hand side of the lever and the operating shaft 15. Even if the slide valve 28 moves so far to the left as to entirely cut off communication between the ports 21 and 23, there will be a slight flow of gas to the oven burner through the by-pass 56 so that when the thermostatic valve again opens due to conditions in the oven causing a slight contraction of the bellows 48, the oven burner will be properly ignited. The pilot burner will also, of course, be continually ignited so long as the manual valve is not closed.

The provision of the small tail portion 30 in the slide valve 28 is desirable when the thermostatic dial 16 is set for a low temperature in the oven. With such a setting, the oven may cool very quickly and with the ordinary type of valve used in a thermostatic valve structure, there is a more or less continued movement of the valve. The use of the tail port 30 enables gas to always flow to the oven burner to at least a small degree, thereby assisting in keeping a constant low temperature in the oven. In many present installations, it is necessary to provide two thermostatic valves, one for higher temperature settings and one for low settings, due to the fact that a single valve actually intended to handle all ranges may entirely close on the lower settings. The provision of a small port to insure a constant flame during low settings of the thermostat is therefore highly desirable.

It will be noted that the present thermostatic valve is so designed that the gas flowing therethrough will not reach the thermostatic elements. That is, the chamber 43 in which the operating elements are positioned is entirely isolated from the passages through which gas flows. This is a highly desirable feature in a valve of this type.

It will be understood that the invention is not limited to the details of constructions disclosed, and that the example of the use of the invention which has been given does not include all of the uses of which it is capable; also, that the phraseology employed in the specification is for the purpose of description and not of limitation.

I claim:

In a thermostatic valve, a valve body including supply and delivery passages opening to one face thereof, a slide valve mounted on said face to control flow between the passages, means to move said valve through a predetermined path for high and low temperature settings, said valve including a large cavity opposite said face to bridge said passages when moving through the portion of its path at which high temperature settings are controlled, and a smaller cavity communicating with the large cavity to bridge said passages when moving over the portion of its path at which low temperature settings are controlled.

BEST PRATT.